Oct. 31, 1933.  J. E. BARIEAU  1,932,951
COMBINATION LUGGAGE AND SKI RACK
Filed Feb. 23, 1932   2 Sheets-Sheet 1

INVENTOR
J. E. Barieau
BY
ATTORNEY

Oct. 31, 1933.  J. E. BARIEAU  1,932,951
COMBINATION LUGGAGE AND SKI RACK
Filed Feb. 23, 1932   2 Sheets-Sheet 2
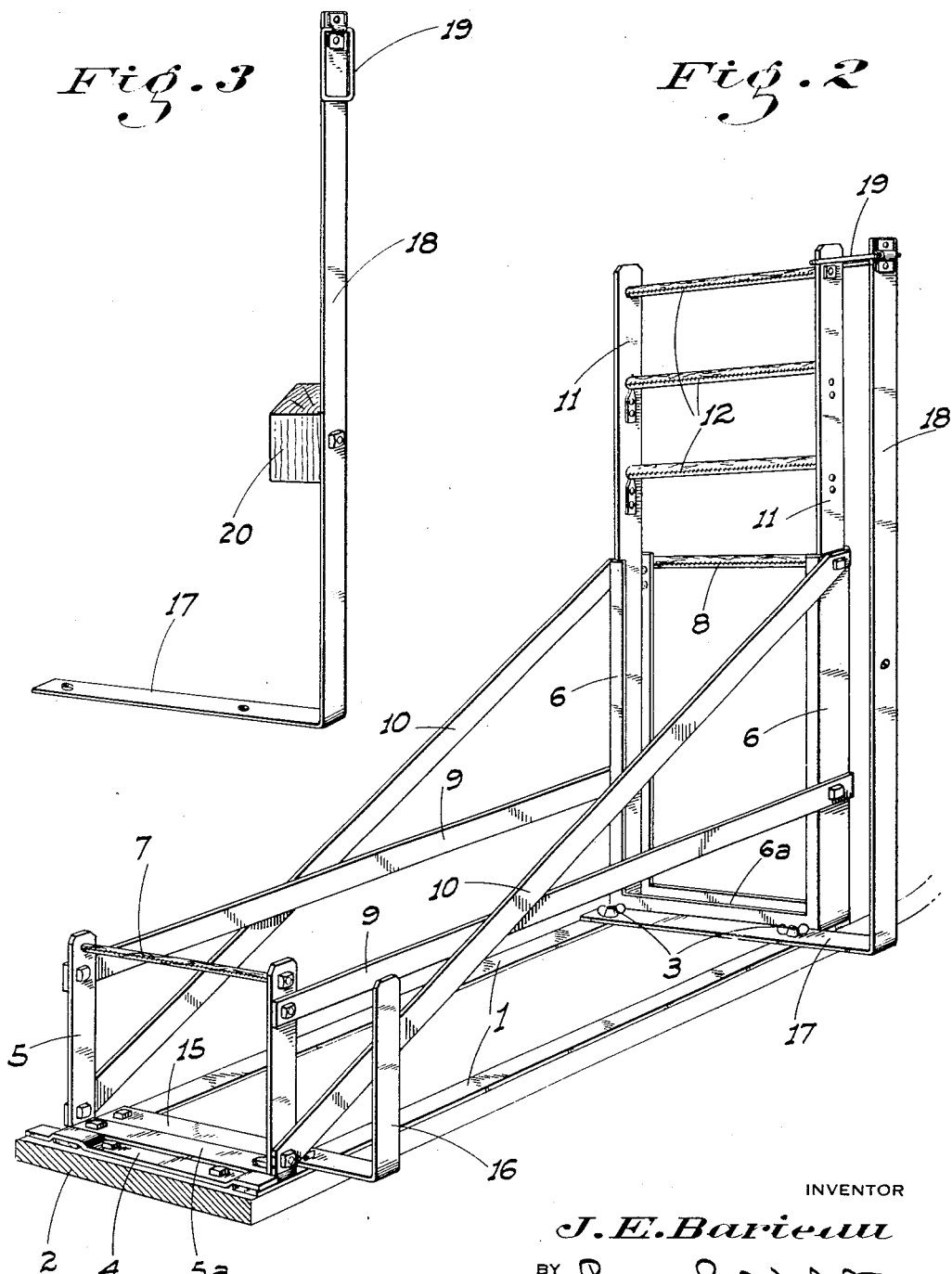
INVENTOR
J. E. Barieau
BY
ATTORNEY Patented Oct. 31, 1933

1,932,951

UNITED STATES PATENT OFFICE 1,932,951

COMBINATION LUGGAGE AND SKI RACK

Jerome E. Barieau, Auburn, Calif.

Application February 23, 1932. Serial No. 594,521

5 Claims. (Cl. 224—29)

This invention relates to carrying attachments for motor vehicle running boards; my principal object being to provide a device of this character particularly designed for use in carrying skis and similar long articles, though it is equally adapted without change to carry suitcases, boxes or luggage generally. The device is so arranged that it may be easily mounted on the running board of any vehicle and will carry six pairs of skis without them being tied in place; without them contacting with the fenders or other part of the car; and without them projecting outwardly of the edge of the fender or running board. A simple additional feature is also provided whereby a toboggan or similar device may be carried in addition to the skis.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in several views:

Fig. 2 is a perspective view of the rack detached and with the toboggan attachment added.

Fig. 3 is a perspective view of the front member of the toboggan attachment showing the member applied when carrying a toboggan on a short wheel base car.

Figure 1:
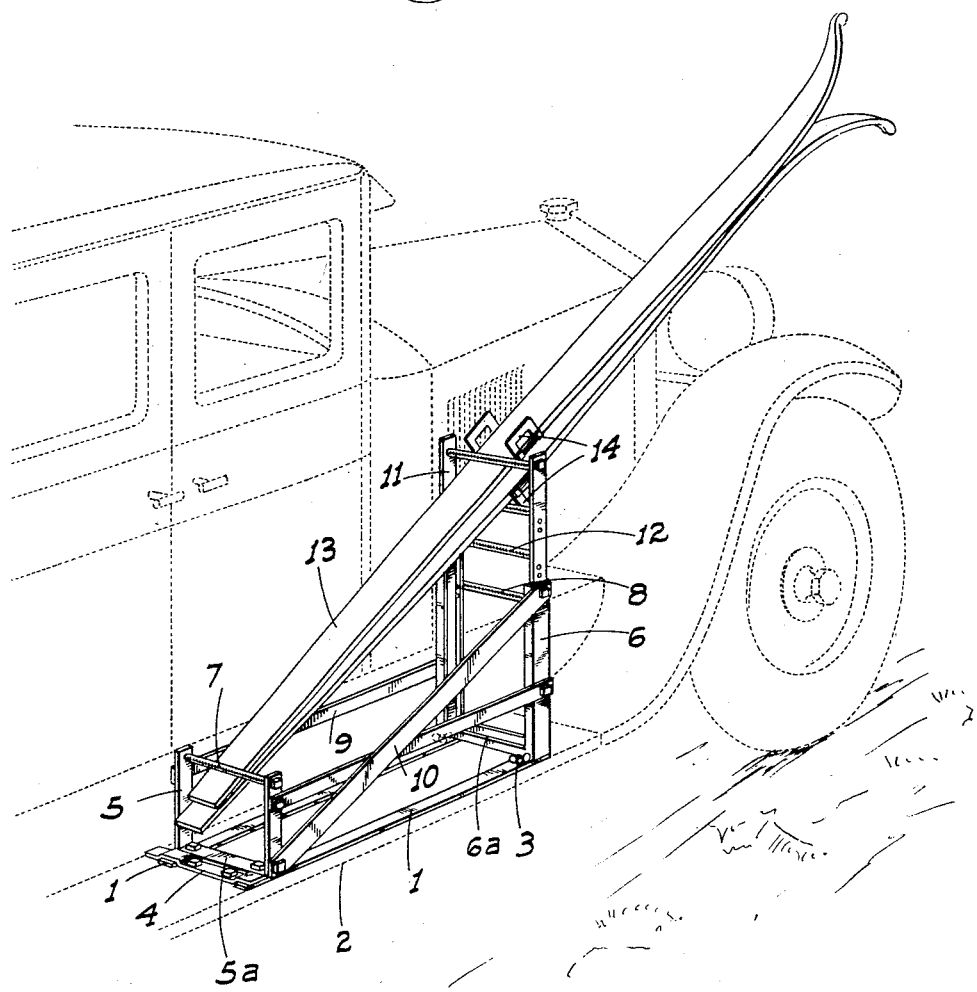
Fig. 1 is a fragmentary perspective outline of an automobile showing my improved carrier or rack mounted thereon and supporting a pair of skis.

Referring now more particularly to the characters of reference on the drawings, the numeral 1 denotes a pair of transversely spaced base bars adapted to rest on the running board 2 of an automobile and to extend rearwardly from adjacent the junction of said running board with the front fender. Adjacent the forward ends the bars are removably clamped to the running board by two nut bolts 3 mounted in said running board. At their rear ends the bars project under a transversely extending and suitably bent cleat 4 secured on said running board.

Just forwardly of the cleat, uprights 5 are secured to the bars 1 by means of an integral cross member 5a; while at the forward end of the bars are other relatively long uprights 6 of channel form in cross section with the channel openings facing each other. These uprights also have an integral cross member 6a at the bottom by which they are rigidly secured to the bars 1. The upright 5 are tied together at the top by a leather covered cross rung 7 while the uprights 6 are tied together at the top and in front by a similar but larger cross rung 8 preferably of tubular form so as to reduce the weight.

Brace straps 9 substantially parallel to the running board connect the corresponding uprights 5 and 6 on the outside while other diagonal braces 10 connect said uprights and extend from the bottom of the uprights 5 to the top of the uprights 6. The rectangular space thus provided between the sets of uprights forms a luggage or box carrier of good capacity and the device may be used for this purpose alone if desired.

The main feature of my invention however is the ski carrying attachment of which the foregoing structure forms a part. This additional feature comprises a pair of transversely spaced bars 11 rigidly connected at intervals from the top down a certain distance by leather covered rungs 12, the upper one of which is preferably removable. The width and spacing of the bars is such that the bar and rung unit may slidably fit in the channel uprights 6 while the length of the bars is such that when they rest on the cross member 6h all the rungs 12 will project above the said uprights, with a space approximately equal to the spacing of the rungs between the lowest rung and the rung 8 of the uprights.

The structure is then ready for use to carry pairs of skis 13, the skis of each pair being placed in face to face relation. The topmost pairs are slid between the topmost rungs 12 so as to be supported by the lower one until the toe strap carriers 14 or the toe straps themselves bear against the adjacent rungs, as shown in Fig. 1, preventing further rearward movement of the skis. The position of the strap carriers relative to the length of the rack and skis is such that the rear ends of the skis then bear against the rung 7 and the weight of the skis is so distributed that there is no tendency for them to tip down. The width between the bars 11 is sufficient to accommodate two pairs of skis; another two pairs may be inserted between the second and third rungs 12, while another two pairs may be inserted between the lower rung 12 and the rung 8; all the skis at their rear ends being held directly or indirectly by the rung 7.

If it is desired to carry a toboggan in addition, a cross strap 15 is removably secured to the bars 1 adjacent the cross member 5a so as to project outwardly of the outer upright 5 some distance. Said cross strap is provided with an upstanding extension 16 at its outer end substantially the height of the upright 5. At the front end of the rack is another cross strap 17 the same length of the strap 15 and removably secured on the bars 1 by the bolts 3. At its outer end the strap 17 has an upstanding extension 18 the same length as the bars 11. A ring 19 is swivelly mounted on the upper end of the extension and is adapted to engage over the upper end of the adjacent bar 11, so as to hold this long extension against possible outward bending movement.

The spacing between the extensions and the corresponding uprights is sufficient to receive a toboggan on edge, which is thus disposed outwardly of the running board and fender. If the car has a short wheel base so that the toboggan would then project in the path of steering movement of the front wheels of the car, I mount a block 20 on the inner face of the upright 18 a sufficient distance above the bottom so that the forwardly projecting portion of the toboggan resting thereon will clear the path of the wheel.

The entire rack may be removed from the running board merely by removing the nuts of the bolts 3, lifting the bars 1 clear of the bolts and pulling the rack forward so that the rear ends of the bars clear the cleat 4. The toboggan holding attachment may be separately removed while the ski carrying attachment may be also separately removed without disturbing the main rack in the event it is desired to retain the rack on the car for carrying suitcases or other luggage.

In all cases, the front door of the car can be opened when the ski carrier is in place; and in all but short wheel-base cars, said door can be opened even when the skis are in place in the carrier.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A carrier rack for motor vehicles comprising a base adapted to be mounted on a running board of a vehicle, transversely spaced corner uprights at the front and rear of the base, a crossbar connecting the rear uprights at the top, said rear uprights being short so as to permit opening movement of an adjacent door thereover, additional uprights removably mounted on said front uprights and projecting above the same, and vertically spaced cross rungs connected to said additional uprights above the front uprights.

2. A carrier rack for motor vehicles comprising a base adapted to be mounted on a running board of a vehicle, uprights at the front and rear of the base at its outer edge, additional uprights disposed outwardly of and in cooperating alinement with the first named uprights, whereby a toboggan or similar device may be received on edge between the cooperating pairs of uprights, and means removably mounting the additional uprights on the base.

3. A carrier rack for motor vehicles comprising a base adapted to be mounted on a running board of a vehicle, uprights at the front and rear of the base at its outer edge, transverse bars resting and removably secured to the base adjacent the uprights and projecting outwardly of the same, and uprights on the outer ends of the bars parallel to the base uprights.

4. A structure as in claim 3, with a catch member mounted on the upper end of one upright to detachably engage the adjacent end of the corresponding base upright.

5. A device as in claim 2, with a cross member removably secured to the outermost front upright intermediate its ends and bridging the gap between said upright and the adjacent base upright.

JEROME E. BARIEAU.